Feb. 11, 1958  L. T. SACHTLEBEN  2,823,256
FILM SCANNING FOR TELEVISION
Filed Oct. 15, 1952
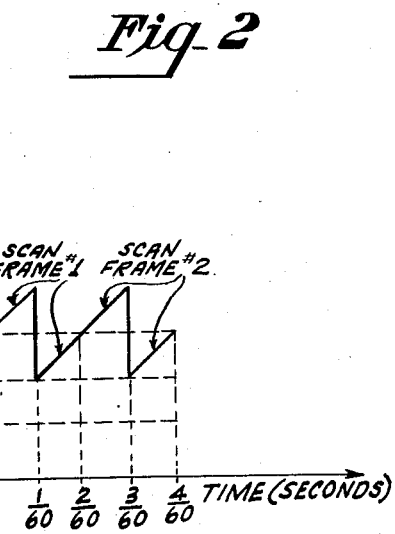
Fig. 1
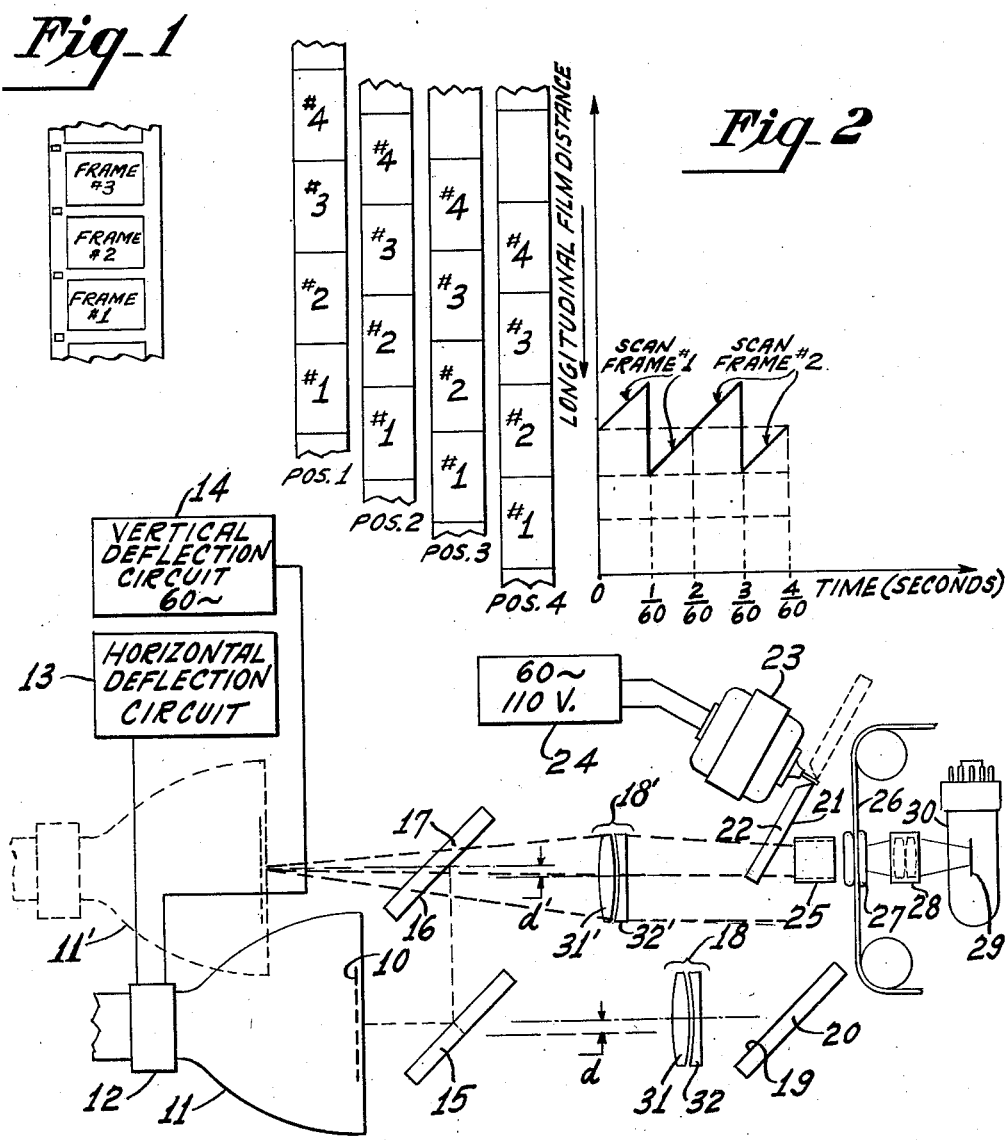
Fig. 2
Fig. 3
INVENTOR.
Lawrence T. Sachtleben
BY
ATTORNEY United States Patent Office 2,823,256
Patented Feb. 11, 1958

2,823,256

FILM SCANNING FOR TELEVISION

Lawrence T. Sachtleben, Haddonfield, N. J., assignor to Radio Corporation of America, a corporation of Delaware Application October 15, 1952, Serial No. 314,764

The terminal fifteen years of the term of the patent to be granted has been disclaimed 15 Claims. (Cl. 178—7.2)

The present invention relates to flying spot scanning of a continuously moving strip of motion picture film for television broadcast.

More particularly, the invention relates to a system of scanning continuously moving film wherein, by reason of the different film speed (for example, 30 frames/sec.) and scanning speed (for example, 60 fields/sec.) it is necessary for the scanning raster to repeat its scanning action on each frame of said film. The present system, moreover, employs alternate optical paths for successive scansions of the film.

United States Patent No. 2,590,281, granted to G. C. Sziklai and A. V. Bedford on March 25, 1952, discloses an arrangement for flying spot scansion employing alternate light paths for successive frame scansions, in which system it is necessary that the optical length of each of such alternate paths be equal to the length of the other of said paths. It is further necessary in a system such as that disclosed by the aforesaid patent to employ mechanical means for vertically shifting the locus or starting point of each projected scanning image on the film so that a given frame of the film will be scanned the requisite plurality of times. This shifting of the locus of the scanning image is necessitated by the continuous movement of the film during the field time of each scanning raster.

It is, therefore, a principal object of the present invention to provide optical means for shifting the location of the scanning raster image with respect to the axis of the objective lens which is normally located in front of the film which is being scanned.

Another primary aim of the invention is that of providing means in the system which will obviate the necessity of insuring identical lengths for the alternate paths, thus eliminating the need for extreme precision in manufacture and assembly and, of course, reducing the ultimate cost of the apparatus.

In general, the present invention contemplates the placing of a suitable lens in each optical path, which lens is adapted, by reason of its structure, to cause the light emerging from it to travel in parallel lines and, further, by virtue of its optical location with respect to the center line of the raster on the cathode ray tube face, to shift the projected rays a predetermined distance above or below the axis of the objective lens which is located before the film, depending, of course, upon whether the lens in the alternate path in question is off-set above or below said center line.

A great advantage of the optical system of the present invention is its extreme flexibility in use, as will appear hereinafter. Briefly, it may be noted at this point that while the lenses mentioned serve the stated objects admirably, they also provide means for correcting for the distortion ordinarily inherent in some of the other optical elements of an alternate path scanning system.

It is, therefore, another object of the present invention to provide means for correcting the distortion of the objective lens in the alternate path film scanning system as well as correcting for other errors such as coma, astigmatism, chromatic aberration and the like.

Still another object of the present invention is to provide optical means for rendering parallel the rays of light directed toward the objective lens of a film scanning system.

An additional object of the invention is that of furnishing an extremely flexible optical system which is capable of a plurality of adjustments depending upon the needs of the particular elements used in conjunction with the system.

While the apparatus of the embodiment disclosed herein is specifically adapted for the scanning of film having a rate of travel of 30 frames per second, each frame being scanned twice in succession, it will be appreciated that the system is readily adaptable for employment in a system wherein the film travels at the rate of 24 frames per second, one example of the latter type being the system disclosed in the above-identified Sziklai and Bedford patent.

Therefore, an additional aim of the invention is to provide a new and improved optical system for use in an alternate path film scanning arrangement, which system is applicable to a plurality of specific arrangements employing various rates of film frame presentation.

Still another object of the invention is that of employing special lenses in the optical paths which will be adjustable to each other as well as with respect to the objective lens.

Other objects and advantages of the present invention will be apparent to persons skilled in the art from a study of the following detailed description in conjunction with the accompanying drawings, in which:

Fig. 1 is a fragmentary view of a motion picture film strip;

Fig. 2 is a graphical illustration of movement of the film strip and relative movement of the scanning raster; and Fig. 3 is a schematic elevational view of an embodiment of the present invention.

In the scanning of continuously moving film by means of a raster produced by a cathode ray tube, there is present the problem of resolving the speed of travel of the film with the usual raster frequency of 30 frames (60 interlaced fields) per second. The problem, as it relates to a system involving film which travels at the rate of 24 frames per second, is discussed in detail in the above mentioned Sziklai and Bedford patent. The present invention is shown in the accompanying drawings as embodied in a film scanning system in which the film travels past the objective lens of the scanning system at the rate of 30 frames per second.

In order to employ 30 frames per second film travel with a raster frequency of 60 fields per second, it is, of course, necessary for each film frame to be scanned twice in succession. Figure 1 illustrates a portion of a strip of 16 mm. film, several frames of the strip being shown in the drawing. It is to be borne in mind that the film is continuously advancing past the objective lens while the scanning raster is projected upon the film. As shown in Figure 2, therefore, it is actually necessary that the projected scanning raster be approximately one-half the height of the film frame, since the projected scanning raster travels from bottom to top while the film advances in a downward direction. More particularly, Figure 2 illustrates graphically the relationship of the film in several discrete positions of its travel with respect to the scanning raster. When the film which, in accordance with conventional practice, is oriented so that the top of the first frame is actually disposed at the lowermost position with respect to the film gate in position 1 of Figure 2 the projected scanning raster begins its upward movement at the top of the first frame, at a time shown on the abscissa as zero. At the end of $\frac{1}{60}$ of a second, the film has reached position number 2 and, by virtue of the combination of film and raster movement, the first frame of the film has been scanned once. By means of the scanning system of the instant invention, as will appear in detail hereinafter, the scanning raster image is then caused to shift its vertical position with respect to the film gate so that the second scansion of the first frame will also have its origin at the "top" of the first frame. In traveling from position 1 to position 2 during the second time interval indicated on the graph, the film frame is scanned for a second time. Succeeding positions of the film are shown along the ordinate of the graph of Figure 2 and the raster scanning fields are indicated along succeeding time intervals on the abscissa of the graph. Thus, as illustrated, the third and fourth positions of the film result in successive scansion of film frame number 2 during the third and fourth 1/60 second time intervals.

One feature of the present invention, therefore, is that of providing means for "chasing" the film during its travel so that the second scansion of each frame may be made to begin at the same point at which the first scansion of that frame had its origin.

Figure 3 illustrates schematically a flying spot scanning system for use with continuously moving motion picture film of the 30 frame per second type. A scanning raster 10 is produced on the phosphor screen of the cathode ray tube 11 which is provided with suitable deflection coils 12 for producing the horizontal and vertical deflection of the cathode ray beam. The horizontal deflection coils are illustrated as deriving a deflection current from circuit 13 which may be of the variety commonly employed in television systems. The vertical deflection for the scanning beam is provided by a vertical deflection circuit 14 which operates, as shown in the drawing, at a frequency of 60 fields per second.

Light emerging from the face of the cathode ray tube 11 travels toward a "semi-reflecting," "semi-transparent" mirror 15 which, as known in the art, will permit half of the energy of the light rays to pass through the mirror while substantially half of the energy of the light rays is reflected upwardly to the reflecting surface 16 of mirror 17 which, as shown, is disposed in parallelism to mirror 15. Light which passes through the semi-transparent mirror 15 travels, along what will be termed the lower optical path of the system, toward and through a lens system indicated generally by reference numeral 18. From the lens system 18, the light from each discrete point in the raster travels in parallel lines toward a reflecting surface 19 of mirror 20 which reflects these parallel light rays upwardly toward reflecting surface 21 of rotating mirror 22. Mirror 22 is preferably semi-circular in form and is suitably rotated by means of an electric motor 23 which derives its energy from a readily available 60 cycle, 110 volt source 24. The motor is so chosen that, by means of suitable gearing (not shown), the semi-circular mirror is caused to rotate once per film frame travel. When the mirror 22 is disposed with respect to objective lens 25 as shown by solid lines in the drawing, light which has been reflected by surface 19 will strike reflecting surface 21 and will be caused to pass through the objective lens 25 to project an image of the scanning raster upon film 26 traveling past the film gate 27. The scanning light, after having passed through the film transparency, will be collected by condenser lens 28 and projected upon the cathode 29 of photo multiplier tube 30. Moreover, when scanning is conducted as described with light from the lower optical path, the mirror 22 in its solid line position blocks light from the upper path and prevents such light from reaching lens 25.

As described thus far, the light has traveled through semi-transparent mirror 15, lens arrangement 18 and has been reflected by means of surfaces 19 and 21 through the objective lens and film. As stated earlier, however, some of the scanning raster light is reflected upwardly by mirror 15 to reflecting surface 16 of mirror 17. Light which has been thus reflected is caused to pass through lens arrangement 18' disposed in proper optical relationship to the rays of light reflected by surface 16. As was the case with the lens 18, lens 18' causes the light to travel in parallel rays toward the objective lens 25. When the semi-circular mirror 22 has rotated to a position shown by dotted lines in the drawing, the light which has passed through lens 18' is permitted to pass directly to objective lens 25 to project an image of the scanning raster upon the film 26. With the semi-circular mirror 22 in the dotted line position it will be understood that light reflected by surface 19 of the lower path will be dissipated and will not reach the objective lens 25. For the purpose of clarifying terminology, the light path from surface 16 through lens 18' to the objective lens 25 will be termed herein as the upper optical path.

As mentioned briefly above, the line sequence of the raster of the cathode ray tube 11 is from top to bottom but the image of the raster on the film is the reverse of this sequence. Furthermore, the projected image of the raster is approximately equal in height to one-half of each film frame. As the film 26 travels at a constant rate downward through gate 27, mirror 22 rotates once for each frame of film motion with the result that each frame is scanned once over the lower optical path of the system and once over the upper path. The combination of the one-half frame translation downward of the film and the simultaneous one-half frame upward progression of the line sequence in the raster image results in the scansion of one complete frame of the film during 1/60 of a second. The second scansion of the first film frame must, however, have its origin at the top of the frame, that is, at the very same point at which the first projected scanning raster began. This vertical shifting of the projected raster image is effected by the alternate use of the two optical paths. As is illustrated in Figure 3, the axis of lens doublet 18 is displaced vertically upward with respect to the effective center line of the raster 10 appearing on the face of the kinescope 11. This vertical displacement is indicated by reference letter "$d$" for the lower optical path. As a result of this displacement of the axis of lens 18 from the center line of the raster 10, the image projected by objective lens 25 upon film strip 26 will also be displaced a corresponding distance proportional to "$d$" upwardly from the axis of the objective lens. The embodiment shown in the drawings illustrates an arrangement in which the axis of lens doublet 18 is displaced above the effective center line of the raster 10, so that light from the lower optical path will actually appear a distance proportional to "$d$" above the axis of the objective lens 25. Conversely, the axis of the doublet lens 18' of the upper optical path is displaced a distance "$d'$" below the effective center line of the scanning raster 10, so that the image projected by lens 25 from the upper optical path will be displaced a corresponding distance proportional to the distance "$d'$" below the axis of objective lens 25.

Where it is desired to effect an "optical interlace," mirror 20 may be tilted somewhat from its position as shown in the drawing to such an angular position that light reflected therefrom will be slightly displaced vertically from the raster image resulting from the upper optical path.

As will be apparent from the foregoing explanation, if, as the film travels downward through the gate 27, the first scansion of the film is effected through the lower optical path and the second scansion thereof through the upper optical path, both scanning raster images will have their origin at the same point on the film.

Because of the arrangement of the mirrors and lenses in the system, the alternating aspects of raster 10 as "seen" by lens 25 have identical orientation in space, the one being transformable into the other by a movement in pure translation. Therefore, no distortions occur in the raster image at the film as the result of dissimilarity in the geometry of the two projections of the raster as "seen" by lens 25. Since the raster appears at all times to be in a plane at right angles to the axis of lens 25 and at a fixed distance therefrom, any distortion in the image of the raster has its origin in the design and construction of lens 25, which will be explained further below. Mirrors 15 and 17 present the kinescope raster to lens 18' in the upper path as though the kinescope were in the position shown by dotted lines in Figure 3, indicated by reference numeral 11'. That is to say, it is in the same relation to lens 18' as the transmitted image of the raster by semi-transparent mirror 15 is to lens 18, except for the fact that lens 18 lies above the axis or center line of the raster a distance "$d$" while, lens 18' lies below such axis an equal distance "$d'$" It might be noted that the distance "$d$" or "$d'$" bears the same ratio to the focal length of lenses 18 and 18' as the focal length of lens 25 bears to half the required separation of the starting points as scanned in two successive raster images in film gate 27, thus causing the raster images to center at equal distances above and below the axis of objective lens 25.

Light passing through film 26 will, after having been condensed by lens 28 onto the cathode 29 of phototube 30, result in the production by tube 30 of electrical signals corresponding to the light values of the scanned film in a manner well known to those skilled in the art.

The system described up to this point, therefore, provides optical means for translating the axis of the projected screening raster in a vertical direction to enable successive scansions of a given film frame to begin at the top of such frame, despite the continuous movement of the film.

In the arrangement shown by the Sziklai and Bedford patent supra, only a single lens corresponding to the objective lens 25 of the instant invention is employed in imaging the raster onto the film. One of the requirements of the arrangement of this type is that the raster must be imaged on the film at the same magnification by way of either alternate optical path. This points up another of the principal objects of the invention, namely, that the requirement for such equal magnification of the two projected raster images would require, in a system of the type shown in the patent, alternate optical paths exactly equal in length. The present invention obviates the need for such extreme precision by its provision of lenses 18 and 18' in the lower and upper optical paths, respectively. The focal length of the lenses 18 and 18' are equal to the focal length of objective lens 25 multiplied by the required ratio of the raster size on the cathode ray tube face to the size of the raster image on the film. In other words, the ratio of lenses focal length of 18 and 18' to the focal length of lens 25 will equal working magnification, and the raster will be effectively in the first principal focal plane of both lenses 18 and 18', while the raster image "seen" by objective lens 25 will appear to be infinitely distant from the objective lens 25. By reason of the fact that most objective lenses suitable for use as lens 25 are corrected for objects at great distances, the arrangement of the instant invention employs lens 25 to its best advantage and, since the raster image is infinitely distant from lens 25, the lens need not be equally distant from lenses 18 and 18'. Critical dimensional requirements which are difficult to obtain in practice are avoided by the present invention, since the optical length of each of the two alternate paths need not be equal to the other, in view of the parallelism of the rays traveling from lenses 18 and 18' to the objective lens 25.

In practice lenses 18 and 18' are assembled in a manner to allow adjustment of the spacing between the positive and negative lens elements 31, 32 and 31' and 32', respectively. The two lens doublets 18 and 18' are then independently moved along their respective axes to produce sharp raster images on the film. The light passing through the film is then collected by the condenser lens 28 which images the aperture of lens 25 upon the electron multiplier cathode 29. Signals generated therein are reproduced as a picture upon the face of a television receiver, as stated supra. An advantage of the present invention resides in the fact that magnification may be independently controlled in the two alternate paths to a limited extent by moving one or the other of the lens doublets to right or left slightly. If the magnification adjustment is not satisfactorily equalized in this manner without causing some deterioration of the focus it is merely necessary to vary the internal spacing of the lens doublets until both focus and magnification are satisfactory.

In order to enable persons skilled in the art to practice the present invention with little or no design difficulties, certain of the practical considerations of the optical arrangements are set forth below, including some desirable dimensional or optical specifications.

As stated above, the lens used as objective lens 25 ordinarily possesses inherent distortions such as pin-cushion or barrel distortions. Such distortion is, of course, extremely objectionable since if any change in the shape of the projected raster image occurs in either of the optical paths, the picture scanned over the two paths will not be in register throughout the entire extent on the television receiver tube. Where an Eastman Cine Ektar 1" e. f. $f/1.4$ is selected for use as lens 25, it may be found to exhibit some pin cushion distortion for images projected from the gate 27 to a distance of several feet. It may, therefore, be necessary to design lenses 18 and 18' so that they will make the raster 10 appear to lens 25 to have the same amount of pin-cushion distortion. To effect this, the distortion of lens 25 should be measured and the design of lenses 18 and 18' based upon such distortion data, at which time lenses 18 and 18' may also be designed for the usual corrections for spherical aberration, coma, astigmatism, curvature, and the chromatic aberrations. It is to be remembered that the air spacing between the elements of each of lenses 18 and 18' may be varied somewhat to produce an exact correction of the objective lens' distortion without introducing any objectionable effects into the image.

One operable embodiment of the invention employs lenses 18 and 18' having the following specifications:

A. Double convex spherical lens:
Material—Bausch and Lomb DBC-3 $\begin{cases} Nd=1.61088 \\ Nh=1.62911 \\ V=57.2 \end{cases}$
glass
$R_1=4.827''\pm.012''$ convex
This surface oriented toward negative element B.
$R_2=5.922''\pm.015''$ convex
Center thickness=$0.483''\pm.003''$
Edged diameter=$2.844''$
Free diameter=$2^{23}/_{32}''$ B. Meniscus concave spherical lens:
Material—Bausch and Lomb EDF-1 $\begin{cases} Nd=1.64900 \\ Nh=1.68397 \\ V=33.8 \end{cases}$
glass
$R_1=20.524''\pm.051''$ convex
$R_2=3.949''\pm.010''$ concave
This surface oriented toward positive element A.
Center thickness=$0.181''\pm.003''$
Edged diameter=$2.500''$
Free diameter=$2.313''$ While the axial separation of the lens elements A and B is nominally $.405''$ for the above specified lens, the separation may be adjusted in practice until the distortion of objective lens 25 is neutralized.

The semi-circular mirror 22 referred to supra as being the means for alternately permitting light from each of the paths to reach the objective lens may be said to act as an "optical switch," since it serves to shift from one to the other of the optical paths within the time required for the vertical blanking pulses of the raster. That is to say, the semi-circular mirror must act to switch from upper to lower optical paths within the extremely short time alloted for the vertical blanking of the raster and, for this reason, design of the semi-circular mirror is rather important. In order to keep the size of mirror 22 as small as possible, it has been found necessary to maintain the effective diameter of the beam of light in the mirror plane quite small. Accordingly, lens 25 should be kept as short in focal length as is practicable, consistent with satisfactory field coverage. In practice, it may further be desirable to fit the objective lens 25 with a stop in its anterior end to cut in half the free area in the plane normal to the axis of the lens and to position the mirror 22 as close to lens 25 as can conveniently be done. By providing a bevel of, for example, 20° on the diametral edge of the mirror 22, provision is made for enabling the diametral edge of the mirror to retain full control of the light beam during the switching interval.

A further point of practical importance is that of possible inequality of the amounts of light reflected and transmitted by semi-transparent mirror 15. It will be appreciated that exact balance between the quantities of the transmitted and reflected light may be attained by the insertion of a sheet of suitable light absorbing material in the path having a greater amount of light. This latter member is not shown in the drawings but will be understood by persons skilled in the art.

Still another aspect of the flexibility of the instant system is the following: separation of the images of the two paths in the film plane, which is a function of the distances d and d' between the axes of lenses 18 and 18', respectively, and the centerline of the raster, is fixed by the location of the lenses. The present invention, however, is adapted to provide a trimming control through the agency of mirror 20. More specifically, by mounting the mirror for rotation about a horizontal axis through the plane of the mirror, the mirror may be adjustably positioned for producing the trimming action by movement of the images slightly in the film plane. Such trimming, moreover, does not introduce any appreciable distortion into the image itself.

A still further item which may be encountered in the construction of the instant optical system is vignetting, since it is desirable for obvious reasons to maintain the size of the various lenses and mirrors within the lowest possible limits. Vignetting, or the loss of light around the edges, may be effectively eliminated in a system such as is illustrated herein by repositioning the axes of lenses 18 and 18' vertically and, in addition, moving the mirrors accordingly to maintain them within the path of the effective light beams. These adjustments, in effect, cause the beam to pass more nearly through the center of the lenses 18 and 18'. It has been found that such adjustment of the positioning of the various elements is a further indication of the optical and mechanical flexibility of the present invention, since such respective positioning within slight limits produces no objectionable effect upon the raster image produced by each of the two optical paths. It should be noted, however, that the distances from the kinescope face to lenses 18 and 18' must be kept the same, since otherwise the magnifications will be incorrect.

Having thus described in detail a complete embodiment of the new and useful optical system for flying spot scansion of continuously moving motion picture film I claim as new and desire to secure by Letters Patent:

1. A cathode ray tube scanning system for continuously moving motion picture film which comprises: a cathode ray tube adapted to produce a beam of light; means for dividing said beam of light into a plurality of paths; a common objective lens; means for directing light from each of said paths to said common objective lens to produce an image of said light on said objective equal in size to the image produced by another of said paths; and individual optical lens means in each of said paths for translating the axis of said image a predetermined distance laterally from the axis of said objective lens.

2. A cathode ray tube scanning system for continuously moving motion picture film which comprises: a cathode ray tube adapted to produce a beam of light; means for dividing said beam of light into a plurality of paths; a common objective lens means for directing light from each of said paths to said common objective lens to produce an image of said light on said objective lens equal in size to the image produced by another of said paths; individual optical lens means in each of said paths for translating the axis of said image a predetermined distance laterally from the axis of said objective, said optical means including a lens disposed in the path of the light and of such character as to cause each beam of said light to travel in parallel rays, whereby the optical length of each path from said lens to said objective lens need not be equal to the corresponding optical length of said other path in order for said projected images to be equal in size.

3. A cathode ray tube scanning system as defined by claim 2 wherein the axis of said lens in each of said paths is so located that its axis is displaced a predetermined distance laterally from the centerline of the raster appearing on the face of said cathode ray tube.

4. A cathode ray tube scanning system as defined by claim 2 wherein said objective lens is located between said film and said cathode ray tube and wherein said lens means is adapted to correct in each of said paths, for inherent distortion of said objective lens.

5. A cathode ray tube scanning system as defined by claim 2 wherein said lens means in each of said optical paths comprises a positive lens element and a negative lens element.

6. A cathode ray tube scanning system as defined by claim 5 including means for adjustably spacing said positive and negative lens elements from each other, whereby to adjust the focal length of said lens.

7. A cathode ray tube scanning system for continuously moving motion picture film which comprises a cathode ray tube adapted to produce a beam of light; means for dividing said beam of light into a plurality of paths; an objective lens; means for directing light from each of said paths to said objective lens to produce an image of said light on said objective lens equal in size to the image produced by another of said paths; optical lens means in each of said paths between said light-dividing means and said objective lens for translating the axis of said image a predetermined distance laterally from the center of said objective lens; and means for selectively and alternately preventing the light of one of said paths from reaching said objective while light from another of said paths is employed for projecting an image on said objective.

8. A system for scanning a continuously moving motion picture film which comprises a cathode ray tube adapted to produce a scanning raster; lens means for projecting the light from said raster onto said film; means including a mirror for dividing said light into a plurality of paths; lens means in each of said paths between said light-dividing mirror and said projecting means arranged to shift the axis of said projected raster a predetermined distance from the center line of the raster appearing on the face of said tube, and means including said lens means for alternately projecting light from each of said separate paths onto said film whereby successive images projected by said paths onto said film may be made to appear on the same portion of said film.

9. A system for scanning a continuously moving motion picture film wherein portions of said film are to be scanned a plurality of times in succession, which comprises: an objective lens; means for causing said film to travel past said objective continuously at a substantially constant speed; a cathode ray tube adapted to produce a scanning raster; light dividing means for causing light from said raster to travel in separate optical paths; means in each of said paths for directing said light toward said objective lens; lens means in each of said optical paths of such character as to cause the light in its path to travel toward said film in parallel rays, each of said lens means having its axis laterally displaced a given distance from and on opposite sides of the centerline of said raster, whereby the raster image projected onto said film by each of said paths is displaced a corresponding distance from the axis of said objective lens; and optical switch means for alternately permitting light from said paths to reach said objective, said distance by which such projected raster image is displaced from the axis of said objective lens being so related to the size of such projected image and such film travel speed as to compensate for film movement so that successive images of said raster may be projected onto the same point on said film.

10. A system as set forth in claim 9 wherein said lens means in each of said optical paths comprises a lens doublet having a positive and a negative lens element.

11. A system for scanning a continuously moving motion picture film as set forth in claim 9 wherein said light-dividing means comprises a semi-transparent mirror.

12. A system as defined by claim 9 wherein said optical switch means comprises a reflecting member and means for rotating said reflecting member into the path of light of one of said optical paths.

13. A system as defined by claim 12 wherein said reflecting member rotating means is timed to move said reflecting member into one of said optical paths once per revolution.

14. A cathode ray tube scanning system for continuously moving motion picture film which comprises: a cathode ray tube for producing a scanning raster; a film gate; an objective lens for producing an image of such raster in said film gate; light operating means for defining light from such raster into a plurality of paths; means for directing light from said paths along parallel paths toward said objective lens; and individual lens means in each of said plurality of paths for imaging such raster onto said objective lens, each of said individual lens means having a focal length proportional to the product of the focal length of said objective lens and the ratio of the size of such raster to the size of the raster image to be produced in said film gate.

15. A cathode ray tube scanning system for continuously moving motion picture film which comprises: a cathode ray tube for producing a scanning raster; a film gate; an objective lens for producing an image of such raster in said film gate; light operating means for defining light from such raster into a plurality of paths; means for directing light from said paths along parallel paths toward said objective lens; and individual lens means in each of said plurality of paths for imaging such raster onto said objective lens, each of said individual lens means having a focal length proportional to the product of the focal length of said objective lens and the ratio of the size of such raster to the size of the raster image to be produced in said film gate, the lens means in at least one of said paths being displaced laterally from the axis of said raster in a selected direction.

References Cited in the file of this patent

UNITED STATES PATENTS

| 1,485,195 | Messter | Feb. 26, 1924 |
| 2,590,281 | Sziklai | Mar. 25, 1952 |

FOREIGN PATENTS

| 507,165 | Great Britain | June 12, 1939 |
| 573,008 | Great Britain | Nov. 1, 1945 |